United States Patent
McLoone et al.

(10) Patent No.: US 8,064,972 B2
(45) Date of Patent: Nov. 22, 2011

(54) USER INTERFACE FOR WIRELESS HEADSET ON A GAMING CONSOLE

(75) Inventors: Hugh E. McLoone, Bellevue, WA (US); Deborah Ann Louis Wallace, Kirkland, WA (US); David W. Russo, Woodinville, WA (US); Gregory Ray Smith, Bellevue, WA (US); John K. Ikeda, Seattle, WA (US); Richard H. Irving, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1180 days.

(21) Appl. No.: 11/771,280

(22) Filed: Jun. 29, 2007

(65) Prior Publication Data

US 2009/0005129 A1    Jan. 1, 2009

(51) Int. Cl.
*H04M 1/00* (2006.01)
(52) U.S. Cl. ............ 455/575.2; 455/41.2; 455/462; 455/41.3; 463/47; 463/40; 463/43
(58) Field of Classification Search ............ 455/575.2, 455/41.2, 566, 569.1, 556.1, 3.05, 462, 39, 455/41.3, 435.1; 381/390, 381, 374, 74; 463/36, 39, 43, 37, 47, 40, 46, 35; 345/157; 340/825; 704/276
See application file for complete search history.

(56) References Cited

U.S. PATENT DOCUMENTS

| | | | |
|---|---|---|---|
| 7,931,537 B2* | 4/2011 | Filer et al. ................. 463/47 |
| 2004/0137967 A1* | 7/2004 | Bodley ................. 455/575.2 |
| 2005/0075885 A1* | 4/2005 | Danieli ................. 704/276 |
| 2005/0169252 A1* | 8/2005 | Riggs ................. 370/352 |
| 2006/0084504 A1* | 4/2006 | Chan et al. ................. 463/39 |
| 2006/0140435 A1* | 6/2006 | Sheehy et al. ................. 381/390 |
| 2006/0166716 A1 | 7/2006 | Seshadri et al. ........... 455/575.2 |
| 2006/0205505 A1 | 9/2006 | Hussaini et al. ................. 463/36 |
| 2006/0205517 A1 | 9/2006 | Malabuyo et al. ............. 463/43 |
| 2007/0015485 A1* | 1/2007 | DeBiasio et al. ............. 455/345 |
| 2007/0021205 A1 | 1/2007 | Filer et al. ................. 463/36 |
| 2007/0047740 A1* | 3/2007 | Andrea ................. 381/74 |
| 2007/0049198 A1* | 3/2007 | Walsh et al. ................. 455/41.2 |
| 2007/0053543 A1* | 3/2007 | Lee ................. 381/381 |
| 2007/0107585 A1* | 5/2007 | Leahy et al. ................. 84/616 |
| 2007/0149246 A1* | 6/2007 | Bodley et al. ............. 455/556.1 |
| 2007/0249422 A1* | 10/2007 | Podoloff ................. 463/43 |
| 2008/0057858 A1* | 3/2008 | Smith ................. 455/3.05 |
| 2008/0233978 A1* | 9/2008 | Batey et al. ................. 455/462 |
| 2008/0235583 A1* | 9/2008 | Ostergaard et al. ........... 715/716 |
| 2008/0311988 A1* | 12/2008 | Smith et al. ................. 463/36 |
| 2008/0312932 A1* | 12/2008 | Smith et al. ................. 704/270 |
| 2009/0117945 A1* | 5/2009 | Mahler et al. ............. 455/569.1 |
| 2010/0238111 A1* | 9/2010 | Chen et al. ................. 345/157 |

OTHER PUBLICATIONS

Xbox, "Xbox 360™ Wireless Headset", http://www.xbox.com, Downloaded from Internet on Apr. 4, 2007, 1 page.
"Logitech Cordless Headset for . . . ,", http://cnet.boston.com, 2006, 4 pages.

* cited by examiner

*Primary Examiner* — Tan Trinh
(74) *Attorney, Agent, or Firm* — Woodcock Washburn LLP

(57) ABSTRACT

A wireless headset having a user interface configured to allow the user to utilize the full functionality of the headset while minimizing the number of physical control inputs necessary is described. The user interface may have a user input control that is configured to control more than one function of the headset. The user interface may also provide audio as well as visual outputs to the user to indicate a particular functionality of the headset being controlled by the user or a particular status of the headset.

20 Claims, 5 Drawing Sheets

USER INTERFACE FOR WIRELESS HEADSET ON A GAMING CONSOLE

COPYRIGHT NOTICE AND PERMISSION

A portion of the disclosure of the patent document may contain material that is subject to copyright protection. The copyright owner has no objection to the facsimile reproduction by anyone of the patent document or the patent disclosure, as it appears in the patent and trademark office patent files or records, but otherwise reserves all copyright rights whatsoever. The following notice shall apply to this document: Copyright© 2007, Microsoft Corp.

BACKGROUND

Gaming devices in the current market typically will provide the user with the ability to connect to another gaming device, typically through an online website or directly through an IP address. Coordination of activities between connected players is quickly becoming a necessity, as connectivity of game devices allow players to play as a team or compete against one another. One component of the communication is typically the ability to verbally communicate with the other players in the gaming environment. In the past, when connected players wished to communicate with the other players, such as commands or questions, the player needed to type in a question using some interface such as a keyboard.

The gaming industry has advanced to the point that verbal communication is now available to most connected players. For example, a player may connect through a broadband connection and speak into a microphone or headset. The audio is translated to digital signals and are sent through the broadband network to the intended recipient or recipients. The gaming interface of the recipient in turn typically translates the digital signal back to audio and is broadcast through a speaker to be heard.

Realizing the potential, the typical gaming headset has undergone significant improvements in its capabilities. For example, the volume of the headset in the past has been typically controlled at the gaming console is now typically controlled on the headset itself. Further, the headset as used today typically is connected to the gaming console wirelessly, thus allowing the gamer a level of freedom of position and movement. Thus, as the capabilities of the headset has increased, so have the number of control inputs. For example, a headset of today will typically have controls on the headset that allow the user to change the volume, and power on or power off the headset.

Although the increased functionality of the headset may afford the gamer a more robust headset, the increased functionality of typical headsets requires the user to become familiar with an increasing number of physical controls.

SUMMARY

According to example embodiments, a wireless headset having a user interface configured to allow the user to utilize the full functionality of the headset while minimizing the number of control inputs necessary is described. For example, a single control input, such as a depressible button on the headset, may control both the power of the headset as well as the volume. Thus, according to one embodiment, the user may be able to control multiple functions of the headset using a single control input.

In another example, to assist the user in controlling the headset functions, the user may be presented with various audio and/or video cues. For example, when increasing the volume of the headset, the user may hear an auditory tone that signifies the volume is increasing. Another aspect of wireless headsets is typically the headset is in communication wireless with a game controller plugged into the game console. A wireless headset may configured to be in communication with one controller, then upon reconfiguration, may be configured to be in communication with another controller. In this example, the status of the headset may be presented using LEDs on the headset. An LED may illuminate when the headset is connected to one of the wireless input ports on the console. Thus, according to another embodiment, the user interface may provide visual or auditory cues that assist the user in determining the status of the interface as well as the status of inputted commands.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

When used with a gaming console, it is preferable to configure the headset to connect to the gaming console wirelessly. This is because the user is provided a degree of freedom of position and movement and thus allows the user to sit further from the console than what is typically provided by a corded headset. Additionally, the headset is preferably ergonomically designed to be worn without discomfort and also designed to present to the user controls that are accessible while the headset is worn by the user and do not cause duress when using the controls. For example, the headset is preferably designed so that pressing the controls does not cause the headset ear piece and microphone to slip out of position.

Figure 1:
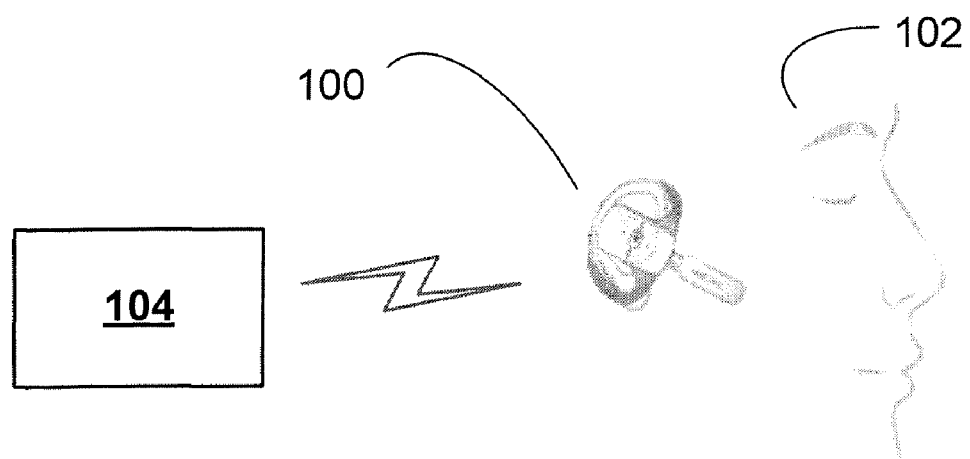
FIG. 1 depicts an exemplary wireless headset in use.

FIG. 1 is an illustration of an exemplary wireless headset having a user interface that reduces the number of physical controls necessary to utilize the functionality of the headset. Shown in FIG. 1 is exemplary wireless headset 100 worn by user 102. Headset 100 has dimensions and weight that preferably permit comfort when worn by user 102. Headset 100 is preferably wireless connected to gaming console 104 during use. Gaming console 104 may include various types of consoles, including a dedicated gaming console such as an XBOX® 360 from Microsoft® as well as a personal computer capable of running gaming applications. The subject matter is not limited to any one particular type of gaming console.

Figure 2:
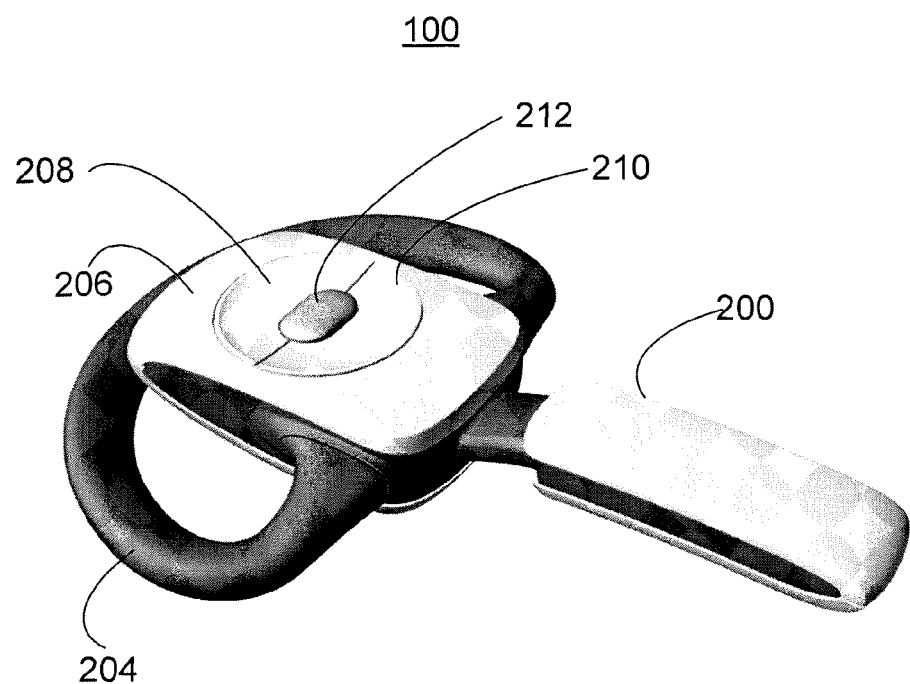
FIG. 2 is an oblique topside view of an exemplary wireless headset.

FIG. 2 is an oblique topside view of exemplary wireless headset 100. One of the functions of headset 100 is to allow the user to talk to other gamers during game play. Thus, headset 100 preferably has microphone member 200 which houses a transducer for receiving audio signals from a user, converting the audio signals to an electrical impulse from transmission to a gaming console. To allow the user to talk into microphone 200 without holding microphone 200, ear clip 204 is provided. A range of ear clip 204 sizes and shapes fit over a range of ear anthropometries of users to secure headset 100 to the side of the head of the user. Ear clip 204 may be sized and shaped in various manners and/or allow for removal from base and rotated to fit alternative ear yet maintain physical controls in correct orientation to the user to accommodate the securing of headset 100 onto either ear of the user, based upon the preference or need of the user.

Ear clip 204 is connected to housing 206. Housing 206 contains, among other items, various electronic components typically found within a wireless headset, such as a transmitter and/or receiver. Housing 206 also presents to the user controls positioned to allow the user to control the functionality of headset 100. For example, headset 100 will typically have a speaker to allow the user to hear communications from connected gamers, described in more detail with reference to FIG. 3 below. The user may wish to change the volume of the speaker to an audio range that may be functional and/or comfortable. Controls 208 and 210 are provided to allow the adjustment of the volume. For example, control 208 may increase the volume of headset 100 speaker while control 210 may reduce the volume of headset 100 speaker.

Also shown is control 212 which may also be used to control various functions of headset 100. For example, control 212 may control the power of headset 100, whereupon depressing control 212 when headset 100 is powered down will cause headset 100 to power up, i.e. turn on. Controls 208-212 may also be configured to provide multiple functionality with each control. For example, control 212 may be configured to power up or power down headset 100, but may also be configured to mute headset 100 speaker as well as reset headset 100. To provide for the multiple functionality, the functions that control 212 may change depending upon the manner in which the user depresses control 212. For example, if the user quickly depresses and releases control 212, control 212 may mute the speaker. If the user depresses control 212 for more than one second while headset 100 is turned off, control 212 may turn headset 100 on.

Controls 208-212 may also be configured to allow the user to bind headset 100 to a gaming console when headset 100 first establishes communication with the gaming console. Binding, which is the establishment of the two entities that will be communicating, is one of a series of processes in which a headset registers with the gaming console and whereby a communication channel is opened between the console and the headset. For example, control 208 may be configured to bind headset 100 to gaming console 104 if control 208 is depressed for greater than 1 second. Control 210 may also be configured to select a particular V-port on the gaming console. A V-port is a communication port available to headset 100 through a particular game controller connected to the gaming console. There are typically four (4) controller ports, thus four (4) V-ports. Once headset 100 is bound to console 104, the particular V-port may be selected. This process may be automatic and may be controlled by control 210. A user may wish to associate headset 100 with a particular game controller, and thus, use control 210 to do so by cycling through open V-ports to the desired V-port position, i.e. the user's controller position.

Additionally, depending upon the configuration of the particular gaming console, calls may be received from outside individuals who are either playing in same game or not playing game yet online to voice chat. A call may be a request from a user not connected to game console 104 to establish communications between the outside user's headset and headset 100 of user 102 through gaming console 104. Thus, controls 208-212 may be configured to answer the call if desired. For example, when a call is received, control 212 may automatically be reconfigured to allow the user to answer or reject the call. If the user wishes to answer the call, the user may quickly depress and release control 212. If the user wishes to reject the call, the user may depress control 212 until an audio indication transmitted through the speaker of headset 100 indicates that the call was rejected. Once the call process is completed, control 212 may be automatically reconfigured back to a prior configuration.

Figure 3:
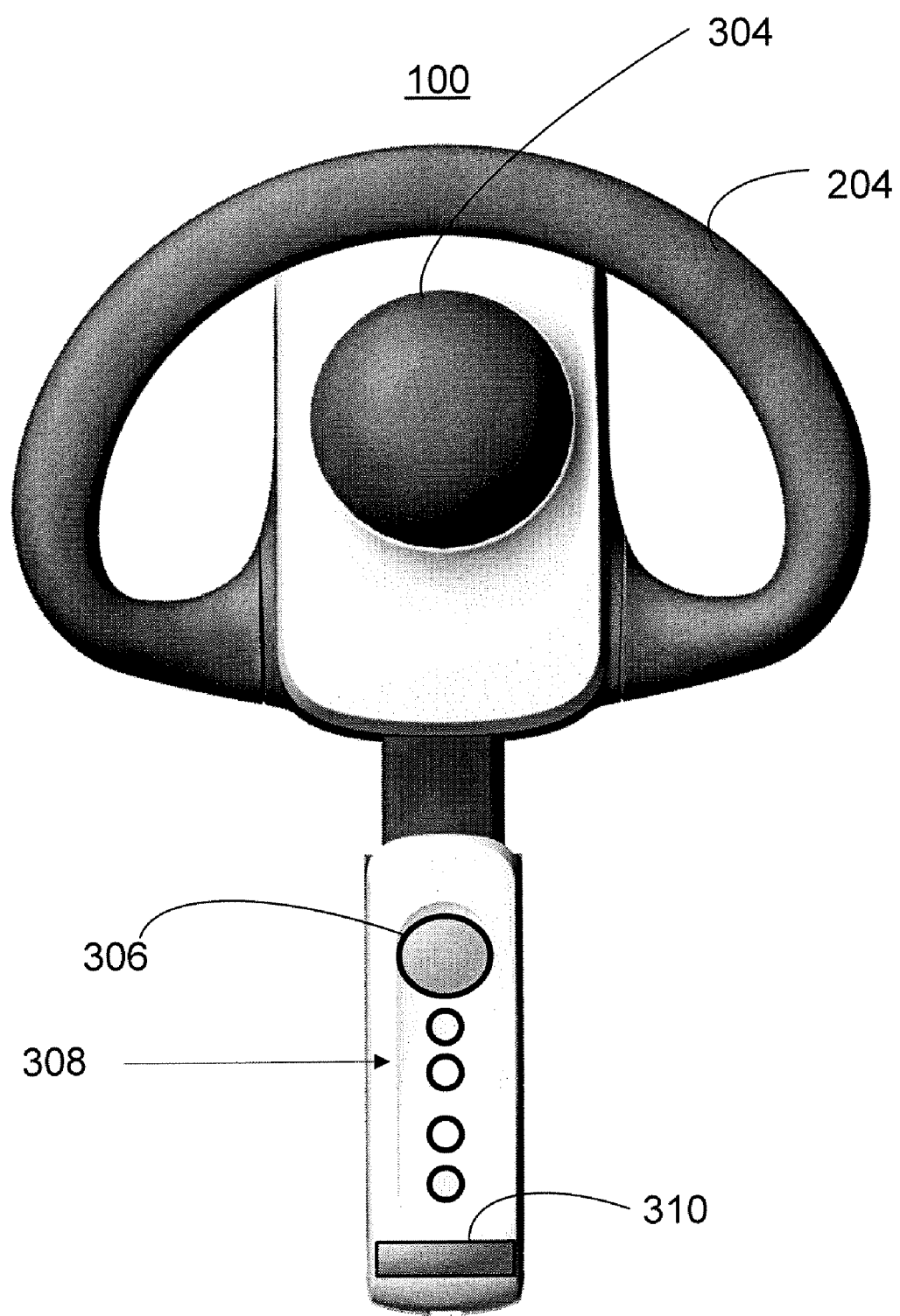
FIG. 3 is a bottom-side view of an exemplary wireless headset.

Audio and visual cues may be provided to the user to assist the user in controlling the functions of or determining the status of the headset. FIG. 3 is a backside view of headset 100. One of the functions of headset 100 may be to allow a user to hear communications from other users. To provider for this function, speaker 304 is provided. When ear clip 204 is situated around the ear of a user, thus securing headset 100 against the ear of the user, preferably speaker 304 is positioned so that the speaker is placed against the ear canal opening of the user.

In addition to hearing communications from another user, the user of headset 100 may also wish to hear audible tones signifying inputs or the status of the headset. For example, the user may wish to hear that the volume of speaker 304 is being increased, decreased, or is muted. Thus, speaker 304 may play a certain tone with increasing amplitude to indicate the increase in volume. Additionally, the speaker may have different tones or cadences for different V-ports selections. As the user progresses through the V-ports to select a particular V-port, the user may hear through speaker 304 various tones or cadences corresponding to the various V-ports.

Another function may be to warn the user of a low battery condition. Because the wireless headset is not connected to any external power supply, an internal battery is necessary to power the headset. A low battery power warning may give the user time to either change headsets or to quit using the headset to allow for charging. The low battery power warning is also useful because the user may be inconvenienced if the headset battery effectively runs out of power during a crucial stage of a game. Thus, if the battery of headset 100 is running low on power, a particular tone may be played through speaker 304 to warn the user of a possible loss of power to headset 100.

Another function of headset 100 may be to allow the user to speak with other users. Thus, microphone 310 is provided. When headset 100 is positioned against the face of a user, preferably microphone 310 is within a proximate distance to the mouth of the user. Other features may also be provided. For example, as discussed above, it may be desirable to select which V-port, i.e. which controller, the headset is connected to. FIG. 3 shows an alternate arrangement in which the V-port may be selected using button 306. This may be desirable to minimize the number of functions controls 208-212 of FIG. 2 are responsible for, thus possibly reducing the complexity of headset 100. Additionally, because button 306 will be against the user's face when wearing headset 100, the possibility of an external, undesired depression of button 306, such as from another person, may be reduced.

Microphone 310 may also be used to input a voice command to control various functions of headset 100, including the V-port selection. For example, to select V-port #1, the user may say, "V-port 1". Other functionalities of headset 100 may also be implemented with voice commands. In another example, the particular configuration of headset 100 may be controlled via voice commands. For example, headset 100 button 208, which may normally be configured to increase the speaker volume of headset 100, may be reconfigured to control the power when a user speaks an audible reconfiguration command.

LED interface 308 may be provided to indicate to the user which V-port has been selected. Once a V-port is selected by the user, one of the LEDs of LED interface 308 may be illuminated. LED interface 308 is preferably positioned adjacent to the user's face when worn and the intensity of the LEDs of LED interface 308 may be reduced. This may prevent an undesirable light emission of one or all of the LEDs of LED interface 308 emitting from headset 100 when one of the LEDs is illuminated.

Figure 4:
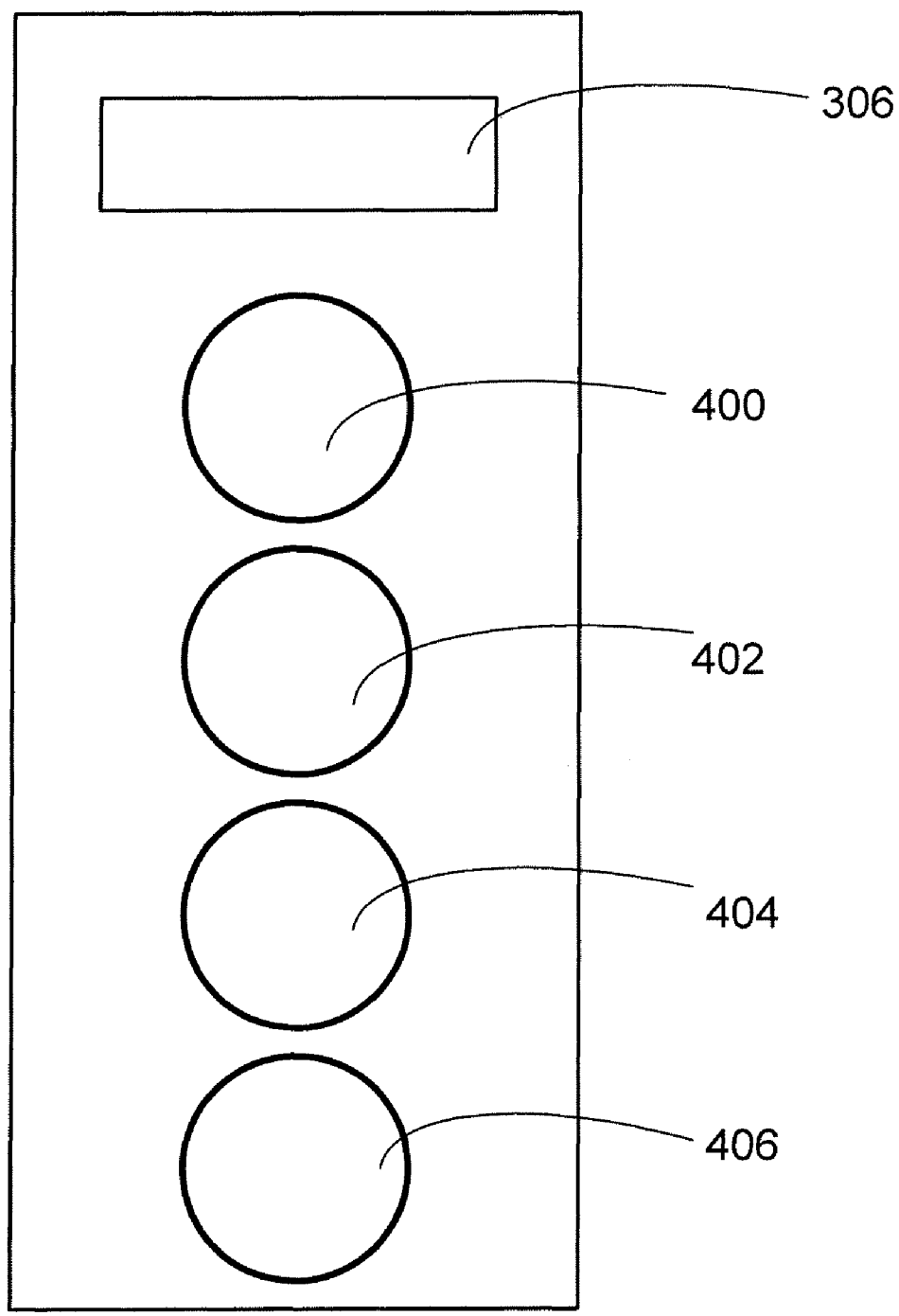
FIG. 4 is close-up view of an LED panel of an exemplary wireless headset.

LED interface 308 may also be configured to provide an additional visual output to the user for other functions or the status of headset 100. In FIG. 4, for example, more than one LED of LED interface 308 may be illuminated as well as various patterns of illumination may be used to indicate a particular function or status of the headset. For example, if the gaming console has four (4) V-ports, LED 400 may correspond to V-port one (1). When the user initially selects V-port 1, LED 400 may blink initially and may turn solid when the headset connects to the V-port selected. LEDs 400-406 of LED interface 308 may be off when the headset is off and may all illuminate temporarily when the headset is turned on. If the headset is attempting to bind to the gaming console, LEDs 400-406 of LED interface 308 may cycle on and off in sequence, i.e. 400 then 402 then 404 then 406, until the headset is bound to the gaming console. If the headset battery is running low on power, LEDs 400 and 402 of LED interface 308 and LEDs 404 and 406 of LED interface 308 may alternately turn on and off. Other types of visual displays may be used, including, but not limited to, a liquid crystal display, a plasma display, or an incandescent light source.

Figure 5:
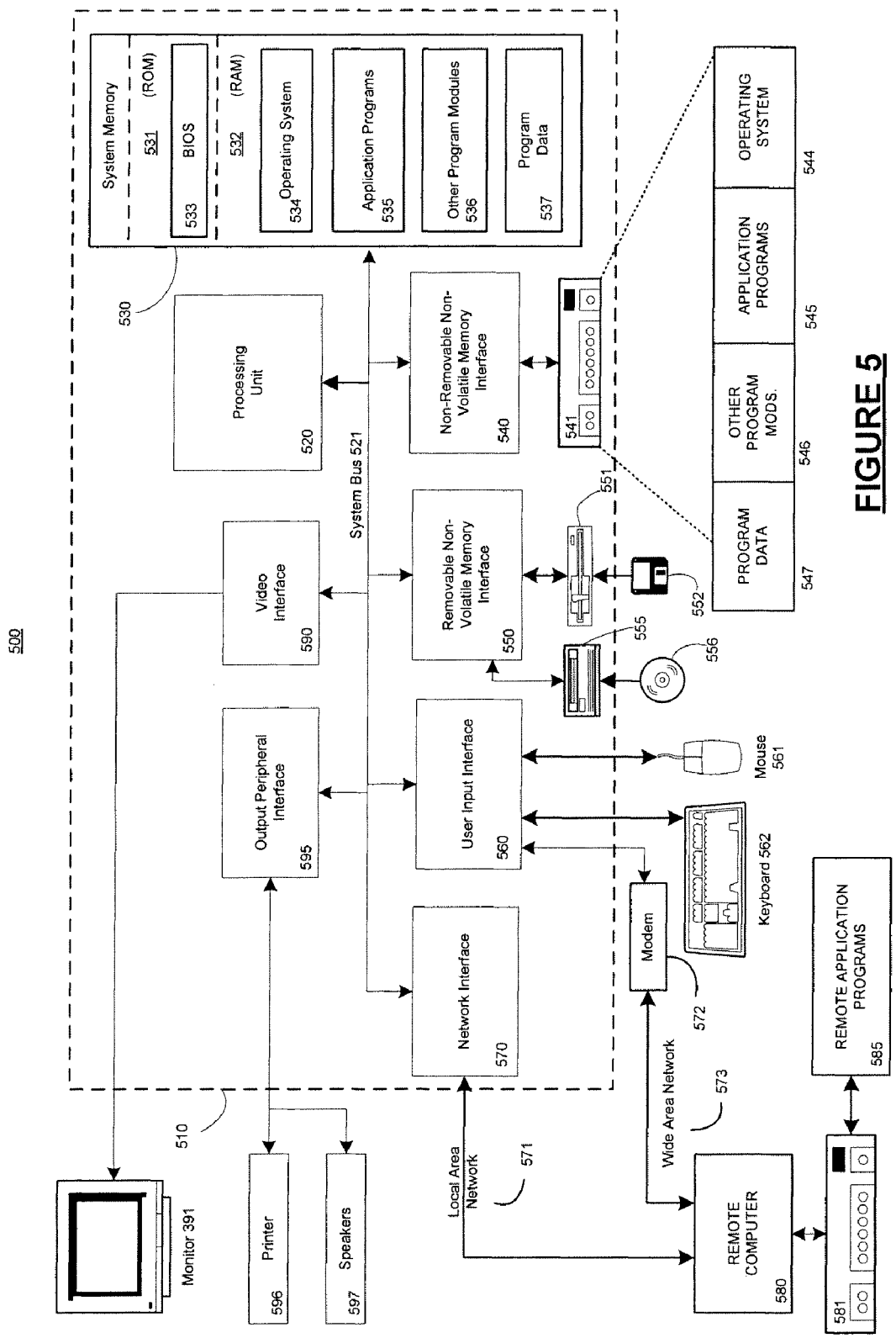
FIG. 5 shows an exemplary computing environment in which aspects of the example embodiments may be implemented.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 5 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A wireless headset user interface for use with a gaming console, comprising:
   a control configured to receive a first user input comprising an audio command, wherein the first user input controls at least one of a plurality of functions, wherein the control is configurable in response to audio user input to selectively activate at least two of the plurality of functions;
   an audio output component configured to generate an audio output corresponding to a first output; and
   a visual output component configured to generate a visual output corresponding to a second output.

2. The wireless headset user interface of claim 1, wherein the first user input further comprises pressing a button on the wireless headset.

3. The wireless headset user interface of claim 1, wherein the functions comprise one of volume up, volume down, power on, power off, V-port selection, mute, user reset, and bind.

4. The wireless headset user interface of claim 1, wherein the audio output is a tone cadence or a frequency.

5. The wireless headset user interface of claim 1, wherein the first output is generated from the first user input to control a function.

6. The wireless headset user interface of claim 5, wherein the first user input comprises one of volume up, volume down, mute, the termination of a communication connection, the answering of an outside request for a communication connection, and a V-port confirmation.

7. The wireless headset user interface of claim 1, wherein the first output is generated from a status of the wireless headset.

8. The wireless headset user interface of claim 7, wherein the status is one of a low battery condition and a received outside request for a communication connection at the gaming console.

9. The wireless headset user interface of claim 1, wherein the visual output component comprises one of a plurality of LEDs, a liquid crystal display, a plasma display, and an incandescent light.

10. The wireless headset user interface of claim 1, wherein the second output is generated from a status of the wireless headset.

11. The wireless headset user interface of claim 10, wherein the status is one of binding to the gaming console, headset out of wireless communication range of gaming console, headset power on, headset power off, a headset low battery, a V-port assignment, and the progress of charging a headset battery.

12. A wireless headset having a plurality of functions, the wireless headset configured to communicate with a gaming console, the wireless headset comprising:
a battery configured to provide power to the headset;
a speaker disposed within a housing, wherein the speaker is operatively connected to a receiver disposed within the housing, wherein the speaker is positioned over an ear canal opening of a user when the headset is properly oriented;
an audio output device disposed within the housing, wherein the audio output device is operatively connected to the speaker and the receiver of the headset, wherein the audio output device is configured to output an audio signal corresponding to a first output;
a microphone operatively connected to a transmitter disposed within the headset;
a control configured to receive a first user input, wherein the first user input controls at least one of the plurality of functions, wherein the control is configurable in response to input received by the microphone to selectively activate at least two of the plurality of functions; and
a visual output component disposed on the headset and operatively connected to an output control device configured to output a visual signal corresponding to a second output.

13. The wireless headset of claim 12, wherein the audio signal is a tone cadence or a frequency.

14. The wireless headset of claim 12, wherein the first output is generated from a user input to control a function.

15. The wireless headset of claim 14, wherein the first user input comprises one of volume up, volume down, mute, the termination of a communication connection, the answering of an outside request for a communication connection, and V-port selection.

16. The wireless headset of claim 12, wherein the first output is generated from a status of the headset.

17. The wireless headset of claim 16, wherein the status is one of a headset low battery power condition and a received outside request for a communication connection at the gaming console.

18. The wireless headset of claim 12, wherein the control is a depressible button disposed on the wireless headset.

19. The wireless headset of claim 12, wherein the visual output component comprises a plurality of light emitting diodes, wherein the second output is generated from a status of the headset, and wherein the status is one of binding to the gaming console, the headset is out of wireless communication range of the gaming console, the headset power is on, the headset power is off, the battery is low on power, the V-port assignment of the headset, and the progress of charging the battery.

20. A wireless headset configured to communicate with a gaming console, the wireless headset comprising:
a plurality of depressible buttons, wherein the depressible buttons control at least one of a plurality of functions comprising:
headset speaker volume up, headset speaker volume down, headset microphone mute, a termination of a communication connection, an answering of an outside request for a communication connection, and a V-port selection;
a plurality of light emitting diodes disposed on the headset, wherein the light emitting diodes are configured to output a visual signal corresponding to a second output, wherein the second output is generated from a status of the headset, wherein the status is one of a binding to the gaming console, a condition that the headset is out of wireless communication range of the gaming console, a condition that the headset power is on, a condition that the headset power is off, a condition that a battery providing power to the headset is low on power, a V-port assignment of the headset, and the progress of charging a battery configured to provide power to the headset;
a microphone configured to provide audio input to select a function that is controlled by the plurality of depressible buttons; and
a speaker configured to provide an output, wherein the output corresponds to a communication from another headset in communication with the headset, the depression of one of the depressible buttons to turn the volume up, the depression of one of the depressible buttons to turn the volume down, the depression of one of the depressible buttons to mute the microphone, the termination of a communication connection, the answering of an outside request for a communication connection, and the depression of one of the depressible buttons to select a V-port.

* * * * *